United States Patent

Buisman et al.

[11] Patent Number: 6,024,784
[45] Date of Patent: Feb. 15, 2000

[54] POLY (3-HYDROXYALKANOATE) PAINT AND METHOD FOR THE PREPARATION THEREOF

[75] Inventors: Godefridus Johannes Hermannus Buisman, Almere; Folkert Petrus Cuperus, Staphorst; Ruud Alexander Weusthuis, Renkum; Gerrit Eggink, Ede, all of Netherlands

[73] Assignee: Instituut Voor Agrotechnologisch Onderzoek (ATO-DLO), Wageningen, Netherlands

[21] Appl. No.: 09/178,605

[22] Filed: Oct. 26, 1998

[30] Foreign Application Priority Data

Mar. 5, 1998 [NL] Netherlands ............... 1008497

[51] Int. Cl.$^7$ ....................................... C04B 9/02
[52] U.S. Cl. ................ 106/14.34; 528/361; 106/14.44; 106/219; 106/220; 106/221; 106/236; 106/238; 524/81; 524/401
[58] Field of Search .............. 528/361; 106/14.34, 106/14.44, 219, 220, 221, 236, 238; 524/81, 401

[56] References Cited

U.S. PATENT DOCUMENTS

| | | | |
|---|---|---|---|
| 5,512,378 | 4/1996 | Bastioli et al. | 428/484 |
| 5,614,576 | 3/1997 | Rutherford et al. | 524/270 |
| 5,711,842 | 1/1998 | Kemmish | 156/332 |
| 5,753,364 | 5/1998 | Rutherford et al. | 428/355 |
| 5,753,782 | 5/1998 | Hammond et al. | 525/450 |
| 5,871,980 | 2/1999 | Naylor et al. | 435/135 |

*Primary Examiner*—Samuel A. Acquah
*Attorney, Agent, or Firm*—Young & Thompson

[57] ABSTRACT

Poly(3-hydroxyalkanoates) (PHAs) are used as binders for drying paint systems, wherein the poly (3-hydroxyalkanoate) component comprises poly (3-hydroxyalkanoate) containing mono- and/or poly-unsaturated side groups. Medium chain length PHAs based on unsaturated vegetable fatty acids are preferred. PHAs are used in the form of a solution in organic solvents and in the form of a dispersion in water. The PHA binders are used for the formulation of solvent-based PHA paint systems and for the formulations of PHA latexes.

33 Claims, No Drawings

POLY (3-HYDROXYALKANOATE) PAINT AND METHOD FOR THE PREPARATION THEREOF

INTRODUCTION

Synthetic binders, such as polyacrylates, polyurethanes, polyesters containing acid and epoxy functional entities, etc. and conventionally also vegetable oils, are used for coatings or paints. Said binders are transesterified with polyhydric alcohols and polybasic acids to give fast-drying alkyd paints which are diluted with a synthetic solvent in order to obtain the desired viscosity and stability. The characteristics of the alkyd coatings are, of course, to a substantial extent determined by the choice of synthetic binders (monomer units) in combination with the network (polymer) that is formed during drying. In existing alkyd paint systems, initial drying is effected by evaporation of the solvent. Final curing takes place through the formation of a so-called polymer network that is formed by chemical bonds (crosslinks), and sometimes physical interactions (crystallisation, H-bridges) between the (unsaturated) fatty acid tails present.

The quantity of synthetic solvent present in the alkyd paint can be reduced if the viscosity of the resin is lowered. Lowering of the viscosity can be achieved, inter alia, by:

lowering the molecular weight of the resin;

a narrow molecular weight distribution;

lowering the glass transition temperature ($T_g$);

the presence of branched or steric groups.

Another method for reducing the use of organic solvents in alkyd paint systems is the development of so-called alkyd dispersions. Recently, alkyd resins have been developed for this type of water-based paint systems, the solvent in the paint system being largely replaced by water. Following evaporation of the aqueous phase, films are produced which have characteristics comparable to those of so-called solvent-based alkyd paint systems.

Poly(3-hydroxyalkanoates) (PHAs) are water-insoluble and biodegradable polyesters which are synthesised intracellularly and accumulated by bacteria and plants. By making use of different raw materials, bacteria and/or plants it is possible to produce a wide variety of types of PHAs [1]. The first commercially available PHA (Biopol produced by Monsanto) is a copolymer which consists of 3-hydroxybutyric acid and 3-hydroxyvalerate (PHB-co-HV). Biopol can be processed in a similar way to "commodity plastics" and currently Biopol is being used in packaging materials (bottles, paper/cardboard coatings). PHB-co-HV is semi-crystalline and can be processed to produce films only above its melting point (140–180° C.).

A relatively new and unknown category of PHAs (medium chain length PHAs) is the group of PHAs which are accumulated by fluorescent pseudomonads [3]. These polymers consist of 3-hydroxy fatty acids having a chain length varying between 6 and 16 carbon atoms. Very diverse functional entities, including (poly)unsaturated, epoxy, hydroxyl, phenyl, bromine and chlorine groups, can be incorporated in the alkyl side chains [4–6]. Mcl PHAs are typically elastomers having a low crystallinity, a low $T_g$ (−55 to −45° C.) and a low melting point (40–60° C.) [7].

Recently the use of PHB-co-HV as an additive (15% by weight) to conventional synthetic binders in paint formulations has been described. The additive results in more rapid curing and a shorter time before the coating is "tack-free". In this context it is assumed that as a consequence of a rapid crystallisation of PHB-co-HV in the presence of the conventional binder a "quasi-crosslinking" occurs which is responsible for the accelerated physical drying. In this case poly(3-hydroxyalkanoates) having short aliphatic side chains (PHB-co-HV; R= side chain =$CH_3$, $CH_2CH_3$) are described as additives in paint systems. The physical properties (melting point, glass transition state, crystallinity) of PHB-co-HV in this case are used in order to improve conventional paint systems based on synthetic binders (curing, drying) [2].

The problem for which the present invention offers a solution is the provision of a more environmentally friendly paint product.

SUMMARY OF THE INVENTION

Poly(3-hydroxyalkanoates) (PHAs) are used as binders for drying paint systems, wherein the poly(3-hydroxyalkanoate) component comprises poly(3-hydroxyalkanoate) containing mono- and/or poly-unsaturated side groups. Medium chain length PHAs based on unsaturated vegetable fatty acids having a monomer length of 6–16 carbon atoms ($C_{6-16}$) are preferred. PHAs are used in the form of a solution in organic solvents and in the form of a dispersion in water. The PHA binders are used for the formulation of solvent-based PHA paint systems and for the formulation of PHA latexes. The relatively high concentrations of unsaturated alkyl side chains which are incorporated in the PHAs has resulted in drying PHA paints having very specific coating characteristics. The functional entity in the aliphatic side chains to a large extent determines the chemical and physical properties of the PHA paints as well as the performance of the final coating (drying, drying time, hardness, gloss, flexibility, adhesion, etc.). PHA paints based on mcl-PHA binder solutions have been studied to determine their drying characteristics. The cured PHA coatings possess relevant characteristics with regard to gloss, flexibility and adhesion on various (flexible) substrates, including plastic, metal, wood, paper and combinations thereof, in particular aluminium and polyesters.

THE INVENTION IN DETAIL

Preferably, the paint product according to the invention produces a biodegradable coating after drying, in contrast to existing paint products. Surprisingly, it has been found, specifically, that paint based on poly(3-hydroxyalkanoate) does not require any synthetic binders. This is a significant advantage compared with the current "environmentally friendly" paint products. In practice poly(3-hydroxyalkanoate) can itself act as binder. A paint according to the invention is provided which can be completely free from non-biodegradable binders. A paint according to the invention is preferably free from any binder other than poly(3-hydroxyalkanoate).

The present invention therefore also relates to a poly(3-hydroxyalkanoate) paint containing poly(3-hydroxyalkanoate) as binder. One embodiment of a polyhydroxyalkanoate paint according to the invention contains more than 85% poly(3-hydroxyalkanoate), based on the weight of the total quantity of polymer material. The preference is for embodiments containing as few additives as possible that are not biodegradable and poly(3-hydroxyalkanoate) paints containing more than 90%, preferably more than 95%, poly(3-hydroxyalkanoate) as polymer material are therefore of interest. On environmental engineering grounds, a PHA paint according to the invention containing 100% poly(3-hydroxyalkanoate) is to be most preferred. All percentages of poly(3-hydroxyalkanoate) are based on the weight of the total quantity of polymer material in the PHA paint.

PHA binder solutions were pigmented and then dispersed (millbase) and diluted with a solvent to the desired viscosity. Following formulations of the PHA paints, coatings were applied to various substrates and the film(-forming) properties were investigated. The results are expressed, inter alia, in the examples.

In particular, PHAs can be used with a good result as binders for paint systems. Poly(3-hydroxyalkanoates) made up of monomers having a chain length of at least 6 carbon atoms and longer can be used in a paint system according to the invention. Monomers having a length of up to 16 carbon atoms are fit for the purpose. Because of their drying properties, PHAs can be used as binders for paint systems. Coatings based on PHB (polyhydroxybutyrate) and PHB-co-PHV (polyhydroxybutyrate-copolymer-polyhydroxyvalerate) dry because the solvent (aqueous phase) evaporates from the paint. During this evaporation a coating is produced as the result of a physical process. The major difference with our invention is that just after evaporation of the solvent a flexible material remains that, as a consequence of chemical drying, continues to cure over time, as a result of which the coating acquires its specific characteristics (good adhesion, flexibility, etc.).

In the case of the paint systems in question, drying must not be seen as the evaporation of solvent but as a combination of evaporation of solvent and curing as a consequence of crosslinking. Unsaturated groups in the PHA are crucial for this. In the existing "PHA coatings" it is one or two specific types that are concerned, namely PHB and PHB-co-PHV, which consequently are not able to dry in the same way as traditional alkyd paints. The definition of drying as applies to our PHA alkyd paints is normal for alkyd paints and, inter alia, is described well in reference 10 and references which are incorporated herein.

Unsaturated PHAs are outstandingly suitable for use in PHA paints according to the invention. Said PHAs can be poly(3-hydroxyalkanoates) having mono- or poly-unsaturated side groups. Poly(3-hydroxyalkanoates) containing at least 30% unsaturated side groups are very suitable. Poly(3-hydroxyalkanoates) containing more than 50% unsaturated side groups are even better. Poly-unsaturated groups are to be preferred. A preferred embodiment of a PHA paint according to the invention contains PHA having at least 10% tri-unsaturated side groups. PHAs having even more unsaturated side groups are to be more preferred. As a result of the presence of unsaturated double bonds in the side chains, networks are formed during drying. The quantity of unsaturated groups in the aliphatic side chains determines the extent of and speed (drying time) with which the network of polyester units is formed. In the case of the binder system according to the invention, drying is appreciably accelerated if drying is carried out at elevated temperatures (oxidative, 50° C.) or if a UV (ultraviolet) drying process (photo-oxidation) is used. After drying, PHA coatings possess relevant properties with regard to hydrophobic characteristics, gloss, flexibility and adhesion to various substrates, including glass, metal, plastic, wood and paper.

Various PHA solutions based on linseed oil and tall oil fatty acids with PHA contents of between 30 and 70% by weight (w/w) are used as binder solutions for drying PHA paints. The PHAs based on linseed oil fatty acids contain more than 50% of unsaturated monomers. An appreciable proportion (14%) consists of $C_{14}$ and $C_{16}$ monomers in which there are three double bonds in the aliphatic side chains. PHAs based on tall oil fatty acids have lower concentrations of unsaturated groups in the alkyl side chains. It has been found that, as a consequence of the higher concentration of unsaturated groups in the aliphatic side chains, PHA paints based on linseed oil fatty acids dry more rapidly than PHA paints based on tall oil fatty acids and as such can be considered the best mode. A successful poly(3-hydroxyalkanoate) paint according to the invention is made up of poly(3-hydroxyalkanoate) based on coconut oil fatty acids, linseed oil fatty acids, rapeseed oil fatty acids or tall oil fatty acids or a combination thereof.

Medium chain length PHAs (mcl-PHAs) in the pure form, in the dissolved form (solvent-based) or in the form of a dispersion in water (latex) have the required characteristics and will therefore find good application as new types of alkyd-type binders in so-called high solid alkyd paints or as alkyd dispersions having highly specific application possibilities. The advantage of the use of unsaturated medium chain length PHAs is that, as a result of the wide choice of available vegetable oils, having highly specific fatty acid compositions, very diverse PHAs can be prepared. An additional advantage is that the polyesters, in contrast to the commercial synthetic binders (resins), can be made up entirely of inexpensive completely renewable raw materials (e.g. vegetable oils). Literature studies have also shown that following network formation (crosslinking) the mcl-PHAs are still completely biodegradable [9]. The combination of properties in conjunction with the fact that the raw materials are renewable and the crosslinked product is completely biodegradable offers interesting possibilities for the use of PHAs as binders for paint systems. The poly(3-hydroxyalkanoates) are advantageously used on the basis of drying oils in paint systems according to the invention. A poly(3-hydroxyalkanoate) having an elastomer character with a low $T_g$ and a low melting point is preferred. A low $T_g$ is −55° C. to −45° C. and a low melting point is below about 80° C. A melting point of between 40 and 60° C. is already suitable. Poly(3-hydroxyalkanoates) based on both animal and vegetable oils are suitable for use.

A suitable group of poly(hydroxyalkanoates) is the group of poly(hydroxyalkanoates) which are made up of monomer units of 3-hydroxy fatty acids having chain lengths varying between 6 and 16 carbon atoms. The way in which PHAs based on linseed oil fatty acids are obtained has recently been described in the literature [3b].

PHA dispersions (latexes) based on linseed oil fatty acids have been pigmented with pigments dispersed in water. The pigmented PHA dispersions were then studied to determine their film-forming characteristics. Films spread on glass and polyester give a pigmented film after evaporation of the water. The films are insoluble in water and the dried PHA latexes are an outstanding binder for the pigments.

Poly(3-hydroxyalkanoate) paint according to the invention contains, in the poly(3-hydroxyalkanoate) component, poly(3-hydroxyalkanoate) having functional-entity-containing side groups of a type and in a number such that drying with ultraviolet, infra red and electron beam is possible. For instance the poly(3-hydroxyalkanoate) can contain side groups provided with one or more of the functional entities from the group comprising unsaturated bonds, hydroxide groups, epoxide groups and halide groups.

It has now proved possible to formulate a poly(3-hydroxyalkanoate) paint according to the invention in which 0–50% of the solvent is organic. Another embodiment preferably contains only 0–25% organic solvent. The customary organic solvent can be used in smaller quantities. Examples of solvents which can be used with PHA paints according to the invention are petroleum ether, diethyl ether, chloroform, aromatic solvents, such as toluene and xylene, and aliphatic solvents, such as C5–C10 alkanes, for example pentane and heptane. Advantageously a poly(3-hydroxyalkanoate) paint according to the invention can contain 50–100% water of the total amount of water and solvent added. This yields a very environmentally friendly product. Highly preferentially a poly(3-hydroxyalkanoate) paint according to the invention has 100% water as "solvent". An advantage of the invention is that the poly(3-hydroxyalkanoate) paint for drying is biodegradable and is less harmful to the environment because the paint will contain less chemical solvents than current PHA-containing paints or other drying paints belonging to the prior art.

It has now proved possible to formulate a poly(3-hydroxyalkanoate) paint according to the invention in which the paint binder consists solely of poly(3-hydroxyalkanoate). a poly(3-hydroxyalkanoate) paint according to the invention can contain all additives customary in paint formulation technology. Examples of such constituents are pigments, driers, matting pigments, fillers, antioxidants, viscosity-modifying agents, rheology-modifying agents, flow improvers and anti-settling agents. The environmental pollution must be minimised for all of these agents as well and biodegradable constituents must be used where possible. The present invention therefore preferably also relates to a poly(3-hydroxyalkanoate) paint which after drying produces a biodegradable coating.

In addition to the new paints themselves, the method for the preparation of a poly(3-hydroxyalkanoate) paint according to the invention in the various embodiments described herein also falls within the scope of the invention. Such a method is characterised in that a solution in organic solvent of poly(3-hydroxyalkanoate) obtained by a microbial or vegetable route is used for the formulation of the poly(3-hydroxyalkanoate) paint with other additives usable for paint. Customary additives are, for example, pigments, driers, matting pigments, fillers, antioxidants, viscosity-modifying agents, rheology-modifying agents, flow improvers and anti-settling agents. A method according to the invention can further be characterised in that a dispersion of poly(3-hydroxyalkanoate), obtained by a microbial or vegetable route, in water is used for the formulation of the poly(3-hydroxyalkanoate) paint in less than 50% organic solvent, preferably in less than 25% organic solvent. As a further development of the method according to the invention, a dispersion of poly(3-hydroxyalkanoate) obtained by a microbial or vegetable route can be used for the formulation of the polyhydroxyalkanoate latex paint. The method according to the invention can be carried out by culturing a poly(3-hydroxyalkanoate)-producing microorganism in a medium provided with drying oils, which oils are either vegetable or animal, and then either using the poly(3-hydroxyalkanoate) after cell degradation in aqueous solution for the further formulation of the paint or using the poly(3-hydroxyalkanoate) after extraction of poly(3-hydroxyalkanoate) with solvent for the further formulation. Advantageously the poly(3-hydroxyalkanoate) solution obtained can optionally be partially or completely concentrated in an intermediate step before proceeding with the formulation of the paint or latex. The methods for achieving microbial PHA production and the way in which this PHA ought to be worked up already form part of the prior art. Thus, for example, a publication on this is included in the enclosed list of references. The content of the cited references must be regarded as being incorporated herein. It ought to be within the scope of an expert in the field to be able to produce large quantities of PHA of the chosen type on the basis of such publications. The type to be generated can be controlled by selection of culture conditions and, in particular, selection of microbial substrate. This technology also forms part of the knowledge already obtainable by a person skilled in the art (see, for example, the references in the introduction). Thus, the formulation of the new paints in a responsible manner from the environmental standpoint is also made possible.

EXPERIMENTAL

1. Preparation of PHA Binders

Linseed oil fatty acids and tall oil fatty acids are used as an energy source (carbon source) for *Pseudomonas putida* KT2442 cultures. The cultures are successively harvested by means of centrifuging, washing with water, lyophilisation, washing with methanol and, finally, drying. PHAs are isolated from the lyophilised cells by means of Soxhlet extraction. The organic PHA solutions obtained are then concentrated with the aid of a film evaporator to solids contents varying between 30 and 70%. The PHA solutions obtained are stored under nitrogen at 4° C. The production of PHAs on the basis of linseed oil fatty acids has recently been described in the literature [3b].

2. Pigmenting of PHA Binders

The following commercial inorganic pigments have been used for pigmenting PHA binder solutions. Titanium dioxide was obtained from Kronos; Iriodin® pigments were obtained from Merck, Darmstadt, Germany.

Titanium dioxide $TiO_2$ (density $\delta=3.9$ g/cm$^3$).
Iriodin®, Iriodin 235 Rutil Perlgruen, (Rutile Pearl Green), pearl gloss pigments ($\delta=3.2–3.4$ g/cm$^3$).
Iriodin®, Iriodin 225 Rutil Perlblau, (Rutile Pearl Blue), pearl gloss pigment ($\delta=3.1–3.3$ g/cm$^3$).
Iriodin®, Iriodin 306 Olympic Gold, pearl gloss pigment ($\delta=3.0–3.2$ g/cm$^3$).
Iriodin®, Iriodin 103 Rutil Sterling Silver (Rutile Sterling Silver), ($\delta=2.9–3.1$ g/cm$^3$).

3. Formulation of PHA Paints

For PHA paints, PHA binder solutions (30–70% by weight solids) were pigmented with the abovementioned pigments. To this end the PHA binder solutions were pigmented to pigment volume concentrations (PVC) of 15 and 25%. After adding dry powder pigments to the PHA binder solutions, the dispersions obtained were then stirred for two hours by means of a magnetic bar stirrer in the presence of 5 mm glass beads.

4. Film Forming with PHA Paint

Dispersed PHA paints were applied to various substrates using a film applicator, the layer thicknesses applied being varied between 60 and 120 micrometers ($\mu$m). Following application the (pigmented) PHA films were dried under various conditions.

a) oxidatively at room temperature b) oxidatively at 50° C. (oven)

c) under UV at room temperature

5. Analytical Methods/Equipment

Use was made of the following test panels for determining the physical properties of pigmented PHA paints:

| | |
|---|---|
| Glass: | 3.0 × 90 × 200 mm |
| Polyester: | 210 × 297 mm (Océ, MC 110, product code 99987354, acrylate-coated polyethylene terephthlate transparent sheets) |

-continued

| | |
|---|---|
| Chromated aluminum: | Type AL, Alloy 3003 H14, 0.6 mm thick, The Q-Panel Company, England. | a) Film Thickness

Film thicknesses of pigmented dry PHA films were determined with the aid of the PIG-Universal meter (BYK-Gardner GmbH, West Germany) in accordance with ISO 2808: 1991 (E), Paints and varnishes—Determination of film thickness, method 5B.

b) Flexibility

The flexibility of pigmented PHA films on aluminium test panels was determined with the aid of a conical mandrel test apparatus (model 1510 No. 950307 Braive Instruments) in accordance with ISO 6860-1984 (E), paints and varnishes—Bend test (Conical mandrel).

c) Hardness

The hardness of pigmented PHA films was determined in accordance with ISO 1522-1973 (E), Paints and varnishes Pendulum damping test: König pendulum (model 3034 M1 No. 960026 Braive Instruments).

d) Gloss and Colour

The gloss of pigmented PHA films was determined with the aid of a Rhopoint NOVO-GLOSS gloss meter in accordance with NEN-ISO 2813 under standard angles of 20°, 60° and 85°.

e) Adhesion

The adhesion of pigmented PHA films was tested on various substrates (glass, aluminium Q-panels) using an Elcometer Model 106 Adhesion Tester (Elcometer Ltd., Manchester) in accordance with ISO 4624:1978, Paints and varnishes—Pull-off test for adhesion. The adhesion of pigmented PHA films on polyester was tested in accordance with the standard DIN standard 53 151 with the aid of PIG-Universal equipment (BYK-Gardner GmbH).

f) Colour

The colour ($a^*$, $b^*$, $L^*$) and colour differences compared with a second measuring point ($\Delta a^*$, $\Delta b^*$, $\Delta L^*$) in pigmented PHA films were determined with the aid of a Minolta Color Reader (Model CR-10) in accordance with ASTM method D 2244-93.

FILM APPLICATOR

PHA paints were applied using a standard film applicator in coating thicknesses varying between 30 and 120 micron.

OVEN DRYING

Oxidative drying at 50° C. was carried out in a Haraeus laboratory oven.

UV DRYING

Photo-oxidative drying was carried out using a UV Stratalinker™ 1800 (Westburg b.v. The Netherlands) fitted with five 8 W UV fluorescent tubes.

6. Results with Regard to the Invention

EXAMPLE 1

Titanium Dioxide PVC=0.25

13.0 g pigment powder ($TiO_2$) were added to 14.3 g PHA (tall oil) binder solution (70%) in petroleum ether (PE 40–60). The PHA solids content is 10.0 g, which corresponds to a volume of 10.0 $cm^3$ PHA ($\delta \approx 1.0$ $g/cm^3$). The volume of $TiO_2$ is 3.29 $cm^3$ ($\delta = 3.95$ $g/cm^3$). The pigment volume concentration for this formulation is $3.29/(3.29+10.0)=0.25$. The pigmented PHA dispersion was then dispersed for two hours.

EXAMPLE 2

Iriodin® 235 Pigmenting PVC=0.15

2.62 g pigment powder (Iriodin® 235) were added to 15.0 g PHA (linseed oil) binder solution (30%) in chloroform. The PHA solids content is 4.5 g, which corresponds to a volume of 4.5 $cm^3$ PHA ($\delta \approx 1.0$ $g/cm^3$). The volume of pigment is 0.79 $cm^3$ ($\delta \approx 3.3$ $g/cm^3$). The pigment volume concentration for this formulation is $0.79/(0.79+4.5)=0.15$. The pigmented PHA dispersion was then dispersed for two hours.

DRYING

PHAs produced by intracellular synthesis and accumulated by microbial systems on the basis of linseed oil fatty acids and tall oil fatty acids have different characteristics with regard to the drying of the PHA paints. In standard paint formulations pigmented PHA coatings based on linseed oil are tack-free after a drying time of 16 hours at 50° C. Comparable PHA paint formulations based on tall oil require a drying time of 40 hours for this. The drying times are appreciably shortened by making use of a UV radiation source (5×8 W). PHA paints based on linseed oil fatty acids and tall oil fatty acids are tack-free within 30 minutes exposure to the UV radiation source. Results are given in TABLE 1.

GLOSS AND COLOUR

Depending on the paint formulation (volume ratio PHA binder to pigment PVC=0.15–0.25), the PHA films possess a high degree of gloss. Results are given in TABLE 2.

Commercial pigments can be dispersed outstandingly in PHA binder solutions (30–70% solids). Depending on the viscosity, stable dispersions are produced which can be applied to a substrate (glass, wood, aluminium and polyester) in various ways. The pigmented PHA films obtained show a homogeneous pigment distribution. As a consequence the colour deviations measured at different measurement points ($\Delta a^*$, $\Delta b^*$, $\Delta L^*$) on the substrate are negligibly small. Results are given in TABLE 3.

ADHESION

Pigmented PHA coatings have good adhesion to glass. Adhesions of between 2.9 and 3.1 $N/mm^2$ were measured irrespective of the choice of PHA binder and the type of pigment. A reference experiment in which the adhesion of a commercial powder coating (Uralac®) on glass was determined shows a comparable adhesion (3.0 $N/mm^2$). Results are given in TABLE 4.

SUBSTRATES

Comparable experiments in which the drying time, hardness, gloss, colour and flexibility of PHA coatings were determined were carried out using both polyester and aluminium test sheets (panels). The drying time is independent of the substrate and here again PHA coatings based on tall oil fatty acids require a longer drying time (40 hours at 50° C.). Results are given in TABLES 5 to 8.

FLEXIBILITY

The pigmented PHA films obtained are relatively soft as a consequence of the elastomer properties of PHAs [7].

The flexibility of the PHA coatings was tested on flexible substrate (polyester transparent sheets) and deformable substrate (aluminium Q-panel). It was not possible to generate cracks in the dried PHA coatings in any way whatsoever when the said coatings were applied to flexible sheets. Official flexibility tests on aluminium Q-panels also revealed no cracks when the conical mandrel test method was carried out. Results are given in TABLE 9. A reference experiment in which the adhesion of a commercial powder coating (Uralac®) applied to an aluminium test panels shows cracks (2 cm, 85 µm film thickness).

Literature 1. a) G. N. M. Huijberts, G. Eggink, P. de Waard, G. W. Huisman and B. Witholt. *Pseudomonas Putida* cultivated on glucose accumulate poly(3-hydroxyalkanoates) consisting of saturated and unsaturated monomers. *Appl. and Environm. Micobiol.* 58: 536–544 (1992)

b) G. Eggink, H. van der Wal, G. N. M. Huijberts and P. de Waard, Oleic acid as a substrate for poly-3-hydroxyalkanoate formation in *Alcaligenes eutrophus* and *Pseudomonas putida, Industrial crops and products* 1, 157–163 (1992)

c) G. Eggink, P. de Waard and G. N. M. Huijberts, The role of fatty acid biosynthesis and degradation in the supply of substrates for poly(3-hydroxyalkanoate) formation in *Pseudomonas putida. FEMS Microbiology Reviews* 103, 159–164 (1992)

d) P. de Waard, H. van der Wal, G. N. M. Huijberts and G. Eggink, Heteronuclear NMR analysis of unsaturated fatty acids in poly(3-hydroxyalkanoates): study of beta-oxidation in *Pseudomonas putida. J. Biol. Chem.* 268, 315–319 (1993)

e) G. N. M. Huijberts, T. C. de Rijk, P. de Waard and G. Eggink, $^{13}$C-NMR studies of poly(3-hydroxyalkanoate) synthesis in *Pseudomonas putida. J. Bacteriol.* 176, 1661–1666 (1994)

f) G. N. M. Huijberts, H. van der Wal, C. Wilkinson and G. Eggink, Gas-chromatographic analysis of poly(3-hydroxyalkanoates) in bacteria, Biotech. Techniques 8, 187–192 (1994)

g) Y. Poirier, C. Nawrath, C. Sommerville, Production of Polyhydroxyalkanoates, a Family of Biodegradable Plastics and Elastomers, in: Bacteria and Plants, *BIO/TECHNOLOGY*, vol. 13, February 1995, pp 142–150.

2. a) P. L. Taylor, Imperial Chemical Industries PLC, *UK Patent Application* GB 2 291 648 (A)

b) I. Noda, Procter & Gamble Co. *Patent WO 97/07229*

3. a) G. N. M. Huijberts and G. Eggink. 1996. Production of poly(3-hydroxyalkanoates) by *Pseudomonas Putida* KT 2442 in continuous cultures. *Appl. Microbiol. Biotechnol.* 46, 233–239 b) E. Casini, T. C. de Rijk, P. de Waard and G. Eggink. 1997. Synthesis of MCL-poly(hydroxyalkanoate) from hydrolysed linseed oil. *J. of Environmental Polymer Degradation*, 5(3), 153–158 (1997)

4. O. Kim, R. A. Gross, D. R. Rutherford, Bioengineering of poly(β-hydroxyalkanoates) for advanced material applications: incorporation of cyano and nitrophenoxy side chain substituents. Can. J. Microbiol. 41(suppl. 1): 32–43 (1995)

5. Y. B. Kim, Y. H. Rhee, S. -H. Han, G. S. Heo, J. S. Kim, Poly-s-hydroxyalkanoates produced from *Pseudomonas oleovorans* grown with ω-phenoxyalkanoates, Macromolecules 1996, 29, 3432–3435

6. G. Eggink, P. de Waard, G. N. M. Huijberts, Formation of novel poly(hydroxyalkanoates) from long chain fatty acids, Can. J. Microbiol. 41 (suppl. 1): 14–21 (1995)

7. G. De Koning, Physical properties of bacterial poly (R)-3-hydroxyalkanoates, Can. J. Microbiol. 41 (suppl. 1): 303–309 (1995)

8. PHA latex patent application: PCT NL 95/06222

9. G. J. M. de Koning, H. M. M. van Bilsen, P. J. Lemstra, W. Hazenberg, B. Witholt, H. Preusting, J. G. Galien, A. Schirmer, D. Jendrossek, A biodegradable rubber by crosslinking poly(hydroxyalkanoate) from *Pseudomonas oleovarans*

10. Organic Coatings: Science and Technology, Vol. I: Film Formation, Components, and Appearance, Zeno W. Wicks, Jr., Frank N. Jones, S. Peter Pappas, Wiley Interscience 1992, Chpt. IX, Drying Oils, pp 133–143

RESULTS ON GLASS

Nine (different) pigmented PHA paints were applied to glass (Panels 1 to 9). The applied coatings were tested to determine the following physical properties.

a) drying b) gloss c) hardness d) adhesion e) film thickness.

It was found that a suitable poly(3-hydroxyalkanoate) paint according to the invention gives, after drying, a coating on glass which has at least an adhesion of 2.9 N/mm$^2$. It was also found that a suitable (poly(3-hydroxyalkanoate) paint according to the invention produces, after drying, a coating on flexible sheets such as polyester and aluminium. Q-panels, which coating remains free from cracks when the conical mandrel test method is carried out.

TABLE 1

PHA paint formulation (drying)

| GLASS PANEL | PHA-type[a] | PVC[b] | Pigment | Wet film thickness µm | Drying conditions |
|---|---|---|---|---|---|
| 1 | TOFA | 0.25 | TiO$_2$ | 90 | UV, RT, 30 min |
| 2 | TOFA | 0.25 | TiO$_2$ | 60 | Oven, 50° C., 40 hours |
| 3 | TOFA | 0.25 | TiO$_2$ | 120 | Oven, 50° C., 40 hours |
| 4 | LOFA | 0.25 | TiO$_2$ | 60 | Oven 50° C., 16 hours |
| 5 | LOFA | 0.25 | TiO$_2$ | 120 | Oven, 50° C., 16 hours |
| 6 | LOFA | 0.15 | Iriodin ® | 60 | Oven, 50° C., 16 hours |
| 7 | LOFA | 0.15 | Iriodin ® | 120 | Oven, 50° C., 16 hours |
| 8 | LOFA | 0.25 | Iriodin ® | 60 | Oven, 50° C., 16 hours |
| 9 | LOFA | 0.25 | Iriodin ® | 120 | Oven, 50° C., 16 hours |

[a] PHAs based on tall oil fatty acids (TOFA) and linseed oil fatty acids (LOFA)
[b] Pigment to Volume Concentration, for definitions see, inter alia, Paint Flow and Pigment Dispersion, Second Edition, T. C. Patton, pp. 126–128; John Wiley & Sons

TABLE 2

PHA paint coatings characteristics (hardness, gloss)

| GLASS PANEL | PVC[a] | Pigment | Film thickness[b] μm | König[c] | Gloss[d] 20° | 60° | 85° |
|---|---|---|---|---|---|---|---|
| 1 | 0.25 | TiO$_2$ | 30 | 14 | 79.9 | 87.5 | 96.8 |
| 2 | 0.25 | TiO$_2$ | 30 | 20 | 76.9 | 88.0 | 93.5 |
| 3 | 0.25 | TiO$_2$ | 50 | 16 | 75.6 | 88.7 | 95.8 |
| 4 | 0.25 | TiO$_2$ | 30 | 36 | 71.7 | 85.9 | 94.8 |
| 5 | 0.25 | TiO$_2$ | 50 | 33 | 72.8 | 86.2 | 96.3 |
| 6 | 0.15 | Iriodin ® | 30 | 41 | 51.9 | 83.3 | 81.0 |
| 7 | 0.15 | Iriodin ® | 50 | 42 | 63.6 | 85.8 | 87.9 |
| 8 | 0.25 | Iriodin ® | 30 | 33 | 6.8 | 17.7 | 8.2 |
| 9 | 0.25 | Iriodin ® | 50 | 47 | 6.5 | 16.5 | 7.7 |

[a] Pigment Volume Concentration
[b] Film thickness after drying
[c] König hardness (number of deflections)
[d] Gloss measured at various angles

TABLE 3

PHA paint coatings characteristics (colour)

| Glass panel | PVC[1] | Pigment | a[#2] | b[#3] | L[#4] | Δa[#5] | Δb[#5] | ΔL[#5] |
|---|---|---|---|---|---|---|---|---|
| 1 | 0.25 | TiO$_2$ | −3.6 | +1.8 | 97.4 | 0.0 | 0.0 | 0.0 |
| 2 | 0.25 | TiO$_2$ | −4.0 | +0.7 | 94.9 | 0.0 | +0.1 | +0.1 |
| 3 | 0.25 | TiO$_2$ | −4.4 | +1.7 | 97.7 | +0.5 | +1.0 | −0.6 |
| 4 | 0.25 | TiO$_2$ | −3.4 | −1.2 | 94.9 | 0.0 | 0.1 | 0.0 |
| 5 | 0.25 | TiO$_2$ | −3.4 | +0.1 | 96.9 | 0.0 | 0.0 | 0.0 |
| 6 | 0.15 | Iriodin ® | −11.2 | +7.5 | 82.5 | 0.0 | +0.2 | 0.0 |
| 7 | 0.15 | Iriodin ® | −11.1 | +6.9 | 85.7 | +0.1 | 0.0 | −0.2 |
| 8 | 0.25 | Iriodin ® | −11.0 | +7.6 | 86.1 | 0.0 | 0.0 | +0.2 |
| 9 | 0.25 | Iriodin ® | −9.8 | +8.0 | 89.3 | 0.0 | 0.1 | 0.0 |

[1] Pigment Volume Concentration
[2] Shift to red (positive values) or to green (negative values) in the colour spectrum
[3] shift to yellow (positive values) or blue (negative values) in the colour spectrum
[4] White (100)/black (0) discolouration
[5] Colour differences compared with first measurement

TABLE 4

PHA paint coatings characteristics (adhesion)

| Glass panel | PHA[a] | PVC[b] | Pigment | Film thickness μm | Adhesion[c] | Adhesion[d] N/mm$^2$ |
|---|---|---|---|---|---|---|
| 2 | TOFA | 0.25 | TiO$_2$ | 40 | 2 > 75% | 3.1 |
| 4 | LOFA | 0.25 | TiO$_2$ | 40 | 2 > 75% | 3.2 |
| 6 | LOFA | 0.25 | Iriodin ® | 35 | 1 > 85% | 2.9 |
| ref[e] | Uralac ® | 0.20 | TiO$_2$ | 42 | 1 > 85% | 3.0 |

[a] PHAs based on tall oil fatty acids (TOFA) and linseed oil fatty acid (LOFA)
[b] Pigment Volume Concentration
[c] Cross-cut method
[d] Elcometer adhesion test
[e] Reference experiment with commercial powder coating

RESULTS ON POLYESTER

Pigmented PHA paints were applied to polyester. Following application the coatings were tested to determine the following characteristics.

a) drying
b) gloss
c) hardness
d) adhesion
e) film thickness
f) flexibility

TABLE 5

PHA paint formulation (drying)

| Polyester Sheet | PHA-type[a] | PVC[b] | Pigment | Wet film thickness μm | Drying |
|---|---|---|---|---|---|
| 1 | TOFA | 0.25 | — | 90 | Oven, 50° C., 40 hours |
| 2 | TOFA | 0.25 | TiO$_2$ | 90 | Oven, 50° C., 40 hours |
| 3 | LOFA | 0.25 | TiO$_2$ | 90 | Oven, 50° C., 16 hours |
| 4 | LOFA | 0.25 | Iriodin ® | 90 | Oven, 50° C., 16 hours |

[a] PHAs based on tall oil fatty acids (TOFA) and linseed oil fatty acids (LOFA)
[b] Pigment to Volume Concentration, for definition see, inter alia, Paint Flow and Pigment Dispersion, Second Edition, T. C. Patton, pp. 126–128, John Wiley & Sons

TABLE 6

PHA paint coatings characteristics (hardness, gloss)

| Polyester Sheet | PVC[a] | Pigment | Film thickness[b] μm | König[c] | Gloss[d] 20° | 60° | 85° |
|---|---|---|---|---|---|---|---|
| 2 | 0.25 | TiO$_2$ | 30 | 23 | 76.8 | 89.6 | 95.0 |
| 3 | 0.25 | Iriodin ® | 30 | 33 | 45.2 | 70.4 | 83.8 |
| 4 | 0.25 | Iriodin ® | 30 | 47 | 4.4 | 12.1 | 4.5 |

[a] Pigment Volume Concentration
[b] Film thickness after drying
[c] König hardness (number of deflections)
[d] Gloss measured at various angles

TABLE 7

PHA paint coatings characteristics (colour)

| Polyester sheet | PVC[1] | Pigment | a[#2] | b[#3] | L[#4] | Δa[#5] | Δb[#5] | ΔL[#5] |
|---|---|---|---|---|---|---|---|---|
| 2 | 0.25 | TiO$_2$ | −3.6 | +3.2 | 98.1 | +0.1 | −0.2 | −0.2 |
| 3 | 0.25 | TiO$_2$ | −4.4 | +1.7 | 97.7 | +0.1 | −0.4 | +0.3 |
| 4 | 0.25 | TiO$_2$ | −3.4 | −1.2 | 94.9 | 0.0 | 0.0 | −0.1 |

[1] Pigment Volume Concentration
[2] Shift to red (positive values) or to green (negative values) in the colour spectrum
[3] shift to yellow (positive values) or blue (negative values) in the colour spectrum
[4] White (100)/black (0) discolouration
[5] Colour differences compared with first measurement

TABLE 8

PHA paint coatings characteristics (adhesion)

| POLYESTER SHEET | PHA[a] | PVC[b] | Pigment | Film thickness μm | Adhesion[c] | Adhesion[d] N/mm$^2$ |
|---|---|---|---|---|---|---|
| 2 | TOFA | 0.25 | TiO$_2$ | 45 | 1 > 85% | 0.6 |
| 3 | LOFA | 0.25 | TiO$_2$ | 20 | 1 > 85% | 0.7 |

[a] PHAs based on tall oil fatty acids (TOFA) and linseed oil fatty acids (LOFA)
[b] Pigment Volume Concentration
[c] Cross-cut method
[d] Elcometer adhesion test

RESULTS ON ALUMINIUM Q-PANELS

Three pigmented PHA paints were applied to aluminium test panels (1 to 3). Following application the coatings were tested to determine the following characteristics.

a) adhesion
b) film thickness
c) flexibility

TABLE 9

PHA paint coatings characteristics (adhesion, flexability)

| Aluminum panel | PHA[a] | PVC[b] | Pigment | Dry film thickness µm | Flexibility[c] |
|---|---|---|---|---|---|
| 1 | TOFA | 0.25 | TiO$_2$ | 40 | pass |
| 2 | LOPA | 0.25 | TiO$_2$ | 40 | pass |
| 3 | LOFA | 0.25 | Iriodin ® | 40 | pass |

[a] PHAs based on tall oil fatty acids (TOFA) and linseed oil fatty acids (LOFA)
[b] Pigment Volume Concentration
[c] Conical mandrel bending test

We claim:

1. Poly(3-hydroxyalkanoate) paint containing poly(3-hydroxyalkanoate) as binder, wherein the poly(3-hydroxyalkanoate) component comprises poly(3-hydroxyalkanoate) having mono- and/or poly-unsaturated side groups.

2. Poly(3-hydroxyalkanoate) paint according to claim 1, wherein the poly(3-hydroxyalkanoate) is an alkanoate based on vegetable and/or animal fatty acids.

3. Poly(3-hydroxyalkanoate) paint according to claim 1, wherein the poly(3-hydroxyalkanoate) component comprises a poly(3-hydroxyalkanoate) based on coconut oil fatty acids, linseed oil fatty acids, rapeseed oil fatty acids or tall oil fatty acids or a combination thereof.

4. Poly(3-hydroxyalkanoate) paint according to claim 1, wherein the content of mono- and/or poly-unsaturated side groups is at least 30% for the poly(3-hydroxyalkanoate) component of the paint.

5. Poly(3-hydroxyalkanoate) paint according to claim 1, wherein the content of mono- and/or poly-unsaturated side groups is at least 50% for the poly(3-hydroxyalkanoate) component of the paint, based on the total number of side groups.

6. Poly(3-hydroxyalkanoate) paint according to claim 1, having a poly(3-hydroxyalkanoate) content of more than 85% based on the weight of the total quantity of polymer material.

7. Poly(3-hydroxyalkanoate) paint according to claim 1, having a poly(3-hydroxyalkanoate) content of more than 90% based on the weight of the total quantity of polymer material.

8. Poly(3-hydroxyalkanoate) paint according to claim 1, having a poly(3-hydroxyalkanoate) content of more than 95% based on the weight of the total quantity of polymer material.

9. Poly(3-hydroxyalkanoate) paint according to claim 1, having a poly(3-hydroxyalkanoate) content of 100% based on the weight of the total quantity of polymer material.

10. Poly(3-hydroxyalkanoate) paint according to claim 1, wherein the content of mono- and poly-unsaturated side groups is at least 10% for the poly(3-hydroxyalkanoate) component of the paint, based on the total number of side groups.

11. Poly(3-hydroxyalkanoate) paint according to claim 1, wherein the content of mono- and poly-unsaturated side groups is more than 14% for the poly(3-hydroxyalkanoate) component of the paint, based on the total number of side groups.

12. Poly(3-hydroxyalkanoate) paint according to claim 1, wherein the poly(3-hydroxyalkanoate) component comprises poly(3-hydroxyalkanoate) that is made up of monomer units having a length of 6–22 carbon atoms.

13. Poly(3-hydroxyalkanoate) paint according to claim 1, wherein the poly(3-hydroxyalkanoate) component comprises poly(3-hydroxyalkanoate) having the side groups having a length of 3–19 carbon atoms.

14. Poly(3-hydroxyalkanoate) paint according to claim 1, wherein the poly(3-hydroxyalkanoate) component comprises the poly(3-hydroxyalkanoate) that is elastomer material having a low $T_g$ and a low melting point.

15. Poly(3-hydroxyalkanoate) paint according to claim 1, wherein the poly(3-hydroxyalkanoate) component comprises poly(3-hydroxyalkanoate) having side groups containing functional entities whereby drying by means of ultraviolet, infrared, microwave and electron beam is possible in the presence of oxygen.

16. Poly(3-hydroxyalkanoate) paint according to claim 1, wherein the poly(3-hydroxyalkanoate) component comprises poly(3-hydroxyalkanoate) having side groups containing functional entities of a type and in a number such that drying by means of ultraviolet, infrared, microwave and electron beam is possible with the exclusion of oxygen.

17. Poly(3-hydroxyalkanoate) paint according to claim 1, wherein the poly(3-hydroxyalkanoate) component comprises poly(3-hydroxyalkanoate) having side groups provided with one of more of the functional entities from the group consisting of unsaturated bonds, hydroxide groups, epoxide groups and halide groups.

18. Poly(3-hydroxyalkanoate) paint according to claim 1, wherein 0–50% of the liquid phase is organic solvent.

19. Poly(3-hydroxyalkanoate) paint according to claim 1, wherein 0–25% of the liquid phase is organic solvent.

20. Poly(3-hydroxyalkanoate) paint according to claim 1, wherein 50–100% of the liquid phase is water.

21. Poly(3-hydroxyalkanoate) paint according to claim 1, wherein 100% of the liquid phase is water.

22. Poly(3-hydroxyalkanoate) paint according to claim 1, wherein 30–70% of the solids content, based on the weight of the total quantity of solids, is poly(3-hydroxyalkanoate).

23. Poly(3-hydroxyalkanoate) paint according to claim 1, characterised in that the paint is usable for all materials selected from the group consisting of plastic, metal, wood, paper, glass and combinations of these materials.

24. Poly(3-hydroxyalkanoate) paint according to claim 1, characterised in that the paint is free from any other binder.

25. Poly(3-hydroxyalkanoate) paint according to claim 1, characterised in that the paint contains further customary additives, selected from the group consisting of pigments, driers, matting pigments, fillers, antioxidants, viscosity-modifying agents, rheology-modifying agents, flow improvers and anti-settling agents.

26. Poly(3-hydroxyalkanoate) paint according to claim 1 which after drying gives a biodegradable coating.

27. Poly(3-hydroxyalkanoate) paint according to claim 1, which after drying gives a coating on glass having at least an adhesion of 2.9 N/mm$^2$.

28. Poly(3-hydroxyalkanoate) paint according to claim 1, which after drying gives a coating on flexible sheets, which coating remains free from cracks when the conical mandrel test method is carried out.

29. Method for the preparation of a poly(3-hydroxyalkanoate) paint according to claim 1, characterised in that a solution of poly(3-hydroxyalkanoate) obtained by a microbial or vegetable route is used in the formulation of the poly(3-hydroxyalkanoate) paint with other additives usable for paint, selected from the group consisting of pigments, driers, matting pigments, fillers, antioxidants, viscosity-modifying agents, rheology-modifying agents, flow improvers and anti-settling agents.

30. Method according to claim 29 for the preparation of a poly(3-hydroxyalkanoate) paint, characterised in that a dispersion of poly(3-hydroxyalkanoate), obtained by a microbial or vegetable route, in water is used in the formulation of the poly(3-hydroxyalkanoate) paint is less than 50% organic solvent.

31. Method according to claim 29 for the preparation of a poly(3-hydroxyalkanoate) paint, characterised in that a dispersion of poly(3-hydroxyalkanoate) in water, obtained by a microbial or vegetable route, is used in the formulation of the poly(3-hydroxyalkanoate) paint in order to obtain poly(3-hydroxyalkanoate) latex.

32. Method according to claim 29, wherein poly(3-hydroxyalkanoate) is obtained by culturing a poly(3-hydroxyalkanoate)-producing microorganism on a medium provided with drying oils, which oils are either vegetable or animal, and the poly(3-hydroxyalkanoate) is then either used after cell degradation in aqueous phase for the further formulation of the paint or is used after extraction of poly(3-hydroxyalkanoate) with solvent for the further formulation.

33. Method according to claim 29, wherein the poly(3-hydroxyalkanoate) solution obtained is optionally partly or completely concentrated in an intermediate step before proceeding with the formulation of the paint or latex.

* * * * *